(12) United States Patent
Kramarczyk et al.

(10) Patent No.: US 7,334,656 B2
(45) Date of Patent: Feb. 26, 2008

(54) HOOD ELEVATION SYSTEM

(75) Inventors: Mark A. Kramarczyk, Sterling Heights, MI (US); Gary L. Jones, Farmington Hills, MI (US); Joseph D. Mc Cleary, Clinton Township, MI (US); Kenneth J. Baron, Sterling Heights, MI (US); Mark O. Neal, Rochester, MI (US); Jenne-Tai Wang, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 94 days.

(21) Appl. No.: 11/120,075

(22) Filed: May 2, 2005

(65) Prior Publication Data

US 2005/0264036 A1 Dec. 1, 2005

Related U.S. Application Data

(60) Provisional application No. 60/574,459, filed on May 25, 2004.

(51) Int. Cl.
*B60K 28/10* (2006.01)
(52) U.S. Cl. ............... 180/274; 180/69.2; 296/193.11
(58) Field of Classification Search ........... 180/69.2, 180/69.21, 274, 281, 69.22, 69.23; 296/193.11
See application file for complete search history.

(56) References Cited

U.S. PATENT DOCUMENTS

| | | | |
|---|---|---|---|
| 5,967,573 A | 10/1999 | Wang | 293/119 |
| 6,167,977 B1 * | 1/2001 | Adamson et al. | 180/69.2 |
| 6,182,782 B1 * | 2/2001 | Matsuura et al. | 180/274 |
| 6,217,108 B1 * | 4/2001 | Sasaki | 296/187.09 |
| 6,302,458 B1 | 10/2001 | Wang et al. | 293/132 |
| 6,364,402 B1 * | 4/2002 | Sasaki | 296/187.09 |
| 6,401,565 B1 | 6/2002 | Wang et al. | 74/502.4 |
| 6,415,882 B1 | 7/2002 | Schuster et al. | 180/69.21 |
| 6,439,330 B1 | 8/2002 | Paye | 180/69.21 |
| 6,513,617 B2 | 2/2003 | Sasaki et al. | 180/274 |
| 6,520,276 B2 * | 2/2003 | Sasaki et al. | 180/274 |
| 6,609,583 B2 * | 8/2003 | Schillaci et al. | 180/69.21 |
| 6,641,166 B2 | 11/2003 | Browne et al. | 280/752 |
| 6,813,562 B2 | 11/2004 | Altan et al. | 701/301 |
| 2002/0170759 A1 | 11/2002 | Son | 180/69.21 |
| 2003/0051936 A1 * | 3/2003 | Ishizaki et al. | 180/274 |
| 2006/0213709 A1 * | 9/2006 | Yamaguchi et al. | 180/69.21 |

* cited by examiner

*Primary Examiner*—Paul N. Dickson
*Assistant Examiner*—Toan C To

(57) ABSTRACT

A hood elevation system for a vehicle includes an actuator configured to selectively move at least a portion of a vehicle hood between an elevated and a retracted position. The hood elevation system also includes a self-locking mechanism configured to allow movement of the hood between the elevated and retracted positions initiated by the actuator, but to resist retraction of the hood as a result of certain loads applied to the hood. The self-locking mechanism thus enables repeated elevation and retraction of the hood. In a preferred embodiment, the self-locking mechanism is configured to deform, thereby absorbing energy from an impact to the hood.

9 Claims, 4 Drawing Sheets

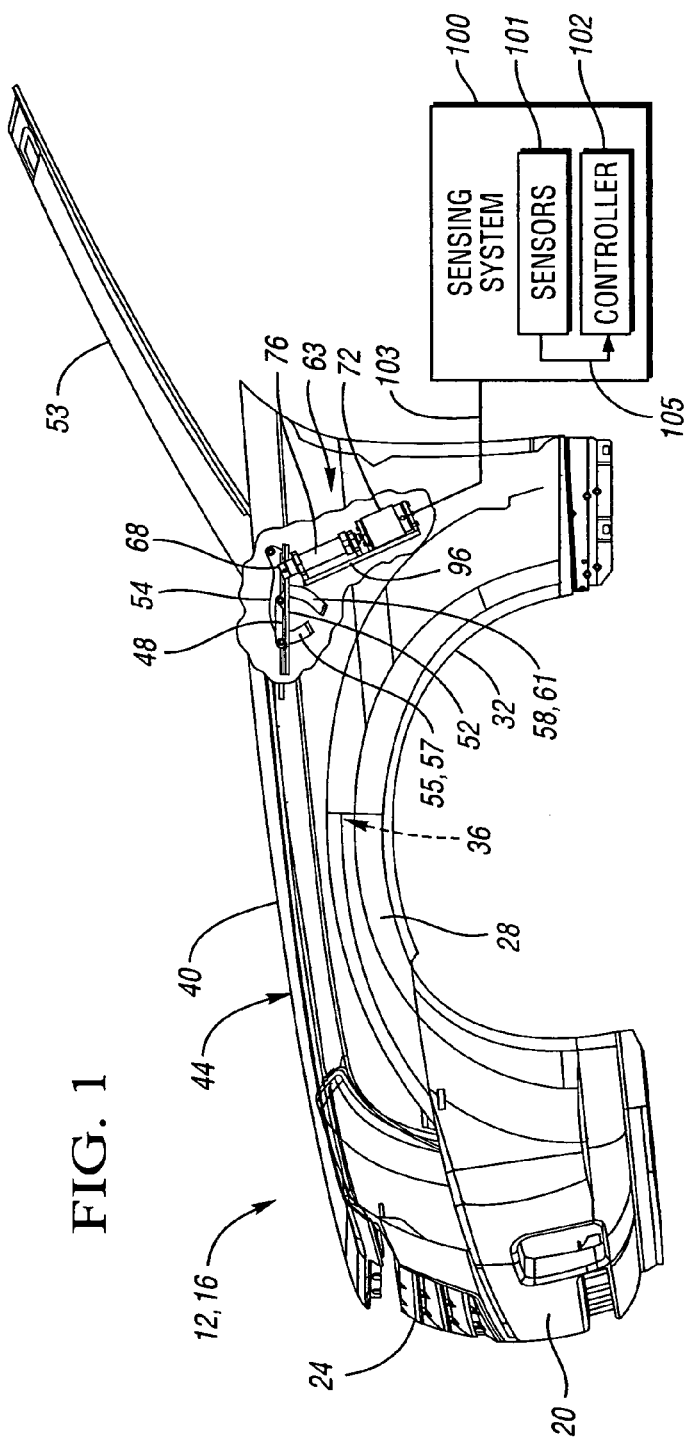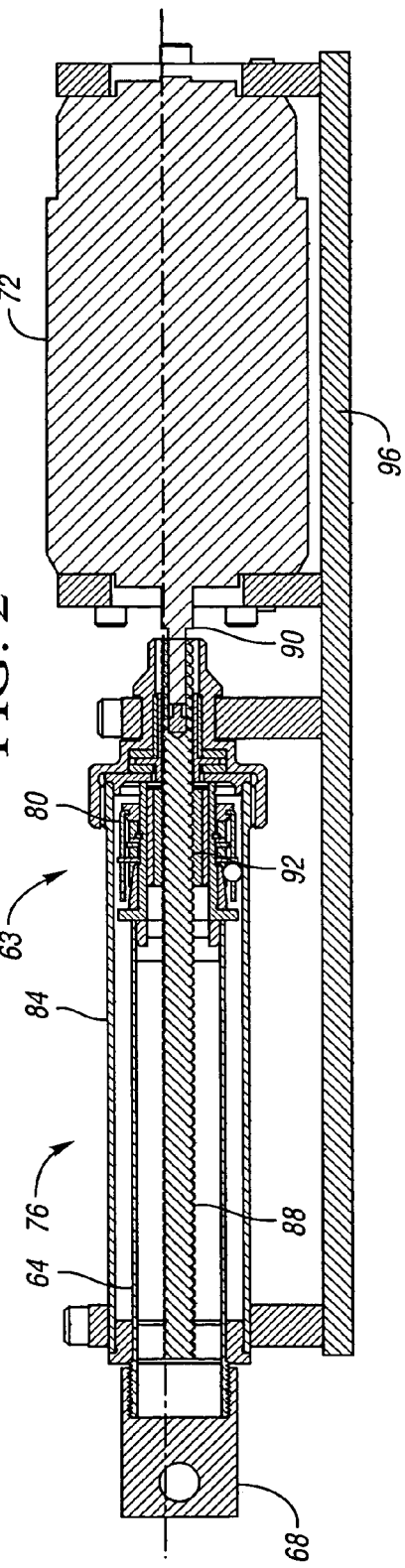
FIG. 1
FIG. 2

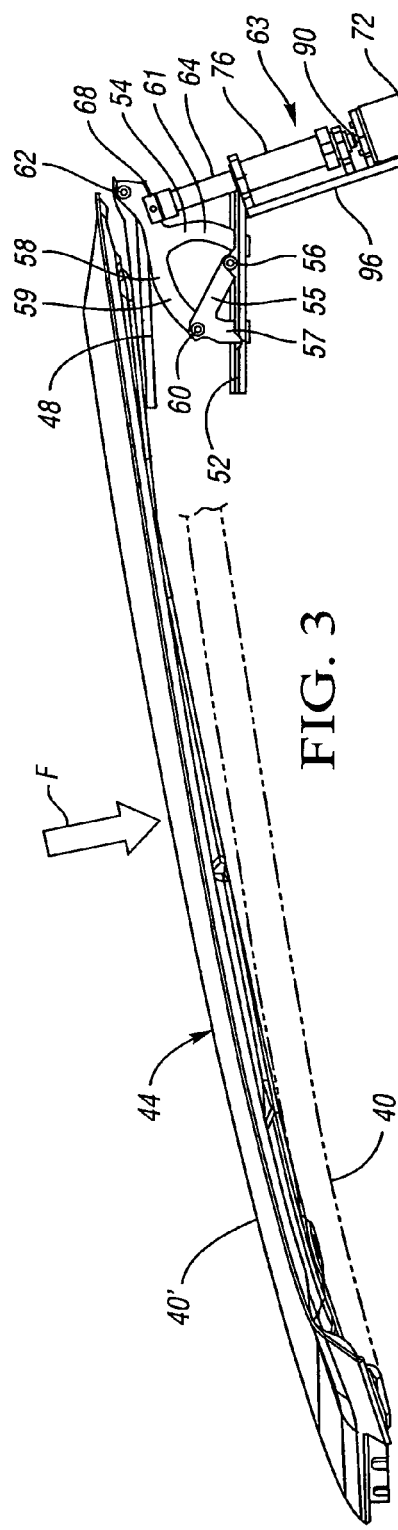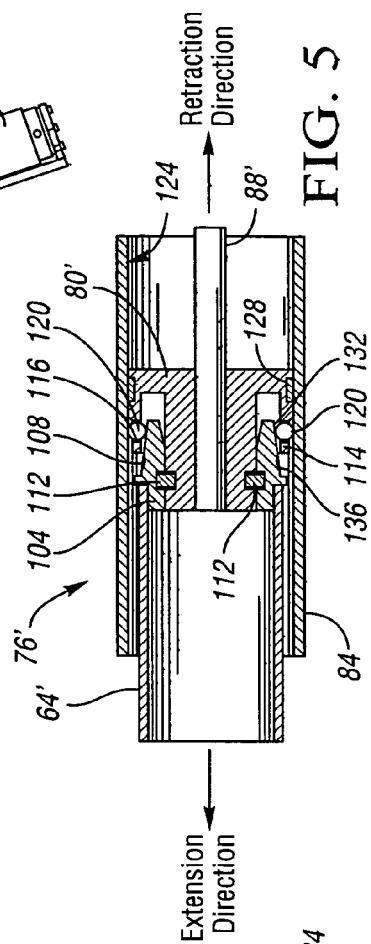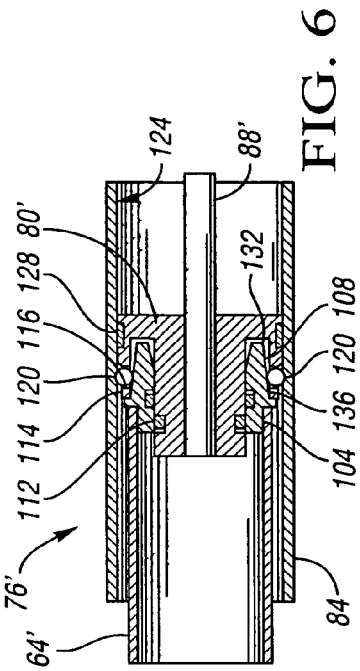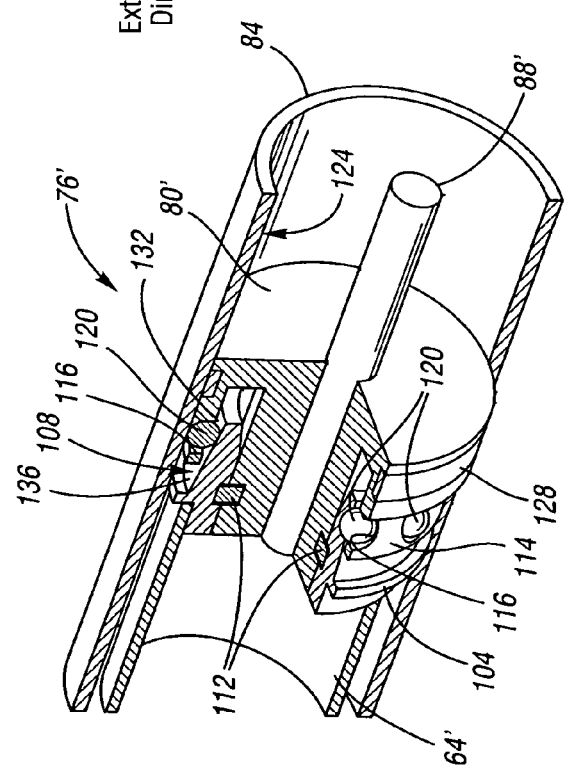

HOOD ELEVATION SYSTEM

CROSS REFERENCE TO RELATED APPLICATION

This application claims the benefit of U.S. provisional patent application No. 60/574,459, filed May 25, 2004, and which is hereby incorporated by reference in its entirety.

TECHNICAL FIELD

This invention relates to vehicles having a hood operatively connected to an actuator for selectively elevating the hood, and a self-locking mechanism for retaining the hood in an elevated position.

BACKGROUND OF THE INVENTION

In certain vehicle impact situations, an object may exert a downward force on the vehicle hood. Deformation of the vehicle hood as a result of the downward force provides impact energy absorption However, the deformation and, correspondingly, the hood's ability to absorb energy, may be impeded by the hood's proximity to components in the engine compartment. Accordingly, clearance between a vehicle hood and engine compartment components facilitates deformation of the hood, or another energy absorbing material operatively connected to the hood, when the hood is acted on with a downward force.

However, minimal clearance between the hood and the engine compartment components may provide significant benefits such as improved driver visibility and aerodynamics.

SUMMARY OF THE INVENTION

A vehicle with a hood elevation system is provided. The vehicle includes a hood configured to cover a front compartment. The hood elevation system includes a member that operatively connects the hood to an actuator such as an electric motor. The actuator is adapted to selectively move the hood between an elevated position and a retracted position by selectively extending and retracting the member. At least a portion of the hood is higher in the elevated position than in the retracted position so that there is increased clearance between the hood and any contents of the front compartment, e.g., an engine, steering components, braking components, cargo, etc. The hood elevation system also includes a locking mechanism operatively connected to the member and configured to resist downward movement of the hood caused by a downward force exerted on the hood, such as during a vehicle impact, while allowing downward movement of the hood initiated by the actuator.

The hood is thus easily retractable in the event that the hood is elevated by the actuator but no impact occurs. Accordingly, a pre-impact sensing system may be employed to monitor the vehicle operating environment and determine when to elevate the hood, because the hood is easily and reversibly retractable in the event that the sensing system initiates elevation of the hood in anticipation of an impact, but no impact occurs. In a preferred embodiment, the self-locking mechanism functions as an energy-absorber during a vehicle impact.

The hood elevation system is preferably automated. Accordingly, a method for advantageously using the hood elevation system is also provided. The method includes monitoring the possibility of vehicle impact, and causing the hood to move from the retracted position to the elevated position in response to the possibility of impact exceeding a predetermined amount.

The above features and advantages, and other features and advantages, of the present invention are readily apparent from the following detailed description of the best modes for carrying out the invention when taken in connection with the accompanying drawings.

BRIEF DESCRIPTION OF THE DRAWINGS

FIG. 1 is a partial cutaway schematic side view of a front portion of a vehicle including a hood elevation system and a hood in a retracted position;

FIG. 2 is a schematic partial cross-section of a portion of the hood elevation system of FIG. 1 including a motor and a self-locking mechanism;

FIG. 3 is a schematic side view of the hood elevation system and hood of FIG. 1 with the hood in an elevated position;

FIG. 4 is a schematic, partially cut-away, perspective view of an alternative self-locking mechanism for use with the hood elevation system of FIGS. 1-3;

FIG. 5 is a schematic cross-sectional view of the alternative self-locking mechanism of FIG. 4 in a first mode;

FIG. 6 is a schematic cross-sectional view of the alternative self-locking mechanism of FIG. 4 in a second mode;

DESCRIPTION OF THE PREFERRED EMBODIMENTS

Figure 7:
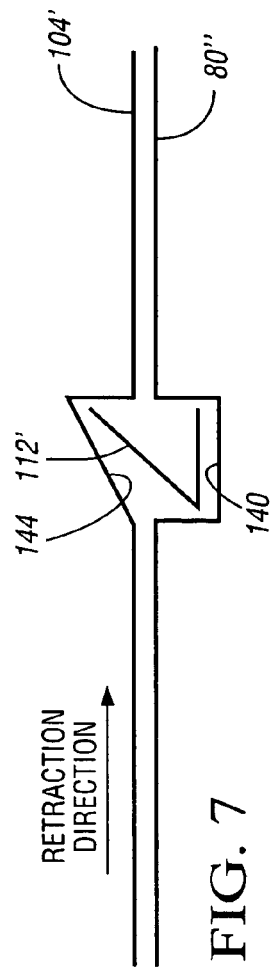
FIG. 7 is a schematic cross-sectional side view of another alternative self-locking mechanism in a first mode.

Referring to FIG. 1, the front portion 12 of a vehicle 16 is schematically depicted. The front face of the vehicle is formed by a front bumper 20 and a grill 24. A fender 28 partially defines a wheel opening 32 and a front compartment 36, which, in the embodiment depicted, is an engine compartment. The front compartment 36 contains various vehicular components (not shown) such as an engine; battery; steering components; braking components; and heating, ventilation, and air conditioning components. A hood 40 defines a portion of the upper surface 44 of the vehicle 16, and is configured to pivot about a set of hinges 48. The hinges 48 are mounted to an upper rail 52 adjacent to a cowl (not shown). A windshield 53 extends upward and rearward of the hood 40.

The hinges 48 are each operatively connected to a hood deployment linkage 54. Referring to FIGS. 1 and 3, the hood deployment linkage 54 includes a first link 55 pivotably connected with respect to the upper rail 52 at pivotable connection 56. The first link 55 includes an arm 57 extending through a first aperture (not shown) formed in the upper rail. A second link 58 includes arm 59 pivotably connected to the first link 55 at pivotable connection 60, and arm 61 extending through a second aperture (not shown) formed in the upper rail. The first and second apertures guide arms 57 and 61, respectively, during movement of the links. Hinge 48 is pivotably connected to the second link 58 at pivotable connection 62. The hood deployment linkage 54 is configured to permit conventional hood opening to access the engine, for example, whereby the hood is lifted at its forward end adjacent the grill 24 and pivoted about the hinges 48 adjacent its rearward end. The hood deployment linkage 54 is also configured to permit the hood 40 to be elevated whereby the hood is lifted adjacent its rearward end while the forward end remains lowered, as explained in further detail below. Those skilled in the art will recognize other hinge and linkage configurations that may be employed within the scope of the claimed invention.

The hood 40 is operatively connected to a hood energy absorption system 63, also referred to herein as a "reversible hood actuator." More specifically, the hood 40 is movably connected to a support member 64 (also referred to herein as "inner tube") via the hood deployment linkage 54 and bracket 68, which may or may not be an integral part of member 64. Bracket 68 is pivotably connected to the hood deployment linkage. The member 64 is operatively connected to an electric motor 72 via a self-locking mechanism 76. The motor 72 functions as an actuator to selectively move the hood 40 between a retracted, or lowered, position, as depicted in FIG. 1, and an extended, or elevated, position, as shown at 40' in FIG. 3, by selectively retracting and extending member 64.

More specifically, member 64 acts on the hood deployment linkage 54 to cause the rearward end of the hood to rise while the forward end of the hood pivots about one or more latches and strikers (not shown). Referring specifically to FIG. 3, the height of the hood relative to the engine compartment in the retracted position, shown in phantom at 40, is less than the height of the hood in the elevated position, shown at 40'. The self-locking mechanism 76 is sufficiently operatively connected to the member 64 to resist downward movement of the member 64 and, correspondingly, the hood 40, caused by an external force F having a vertical component applied to the hood during a vehicle impact; the self-locking mechanism 76 allows downward movement of the member 64, and correspondingly, the hood 40, initiated by the actuator.

Motor 72 is preferably a direct drive motor that is coaxially aligned with the self-locking mechanism 76 to minimize the required packaging space. Referring specifically to FIG. 2, the self-locking mechanism 76 includes a shuttle 80 located inside an outer tube 84 for translation therein. An actuating member 88, which is a lead screw in FIG. 2, is connected to the output shaft 90 of the motor 72 to transmit the motor torque and speed to the lead screw 88. The lead screw 88 is connected to a nut 92, which in turn is connected to the shuttle 80. Member 64 is an inner tube connected to the shuttle 80 for translation therewith. The self-locking mechanism 76 is substantially similar to the self-locking mechanisms described in U.S. Pat. No. 5,967,573, issued Oct. 19, 1999 to Wang; U.S. Pat. No. 6,302,458, issued Oct. 16, 2001 to Wang et al; U.S. Pat. No. 6,401,565, issued Jun. 11, 2002 to Wang et al; and U.S. Pat. No. 6,641,166, issued Nov. 4, 2003 to Browne et al; each of the aforementioned patents being hereby incorporated by reference in its entirety.

Referring again to FIG. 1, the motor 72 and the self-locking device 76 are supported and retained by a hood elevation system frame 96, which is mounted to the vehicle's upper mid-rail (not shown) in a manner to allow the degrees of freedom that may be required by the hood deployment linkage 54. The motor 72 is controlled by a sensing system 100 (pre-impact or impact initiation) located elsewhere on the vehicle that determines when hood elevation, or "hood deployment," is required.

The sensing system 100 includes sensors 101 and a sensing system controller 102. The sensors monitor the vehicle environment and transmit signals 105 carrying sensor data describing vehicle environmental conditions to the controller. The sensing system controller 102 is programmed to analyze the sensor data from the signals 105 to determine if one or more predetermined vehicle conditions indicative of an elevated risk of vehicle impact exist. The controller includes a data storage medium with stored data that the controller uses to determine the presence or absence of the one or more predetermined conditions based on the sensor data. Those skilled in the art will recognize that the stored data may be in a multitude of forms within the scope of the claimed invention, such as relational databases, look-up tables, formulae, etc. Those skilled in the art will also recognize a variety of sensing system 100 configurations that may be employed within the scope of the claimed invention. For example, sensors 101 may include radar sensors, video sensors, photoelectric sensors, etc. The sensing system may also include radar transmitters (not shown).

The controller 102 is programmed and configured to generate a signal 103 that causes the activation of the motor 72, which in turn causes member 64 to move in an extension direction to move the hood to the elevated position, when the controller determines the existence of the one or more predetermined conditions.

Under normal usage the hood 40 will remain in the retracted position to optimize vehicle requirements other than energy absorption of the hood. However, when it is determined by the sensing system 100 that the hood 40 should be deployed to the elevated position, the motor 72 is engaged to turn the screw 88, which drives the nut 92 and shuttle 80 of the self-locking mechanism 76 along the length of the screw 88. The self-locking mechanism 76 extends the inner tube 64, which through its attachment to the hood deployment linkage 54 causes the hood 40 to rise to the elevated position and creates additional under-hood clearance. The hood 40 will stay in the elevated position without input from the motor 72 due to the self-locking mechanism 76.

After a hood deployment, if the sensing system 100 determines that the possibility of impact has been low in the last "x" seconds (e.g., "x" is equal to 5 seconds), the system operation is reversed to lower the hood 40 from the elevated position to the retracted position. That is, the motor 72 is engaged to turn the screw 88 in the opposite direction from deployment. The nut 92 and shuttle 80 are pulled down the screw 88 allowing the weight of the hood 40 to return the hood deployment linkage 54 and inner tube 64 to the retracted position. Early detection, or pre-impact sensing systems, such as radar, can be used with the hood deployment system 63 since an erroneous deployment can be quickly and automatically reversed. This same early detection sensing system could be used for pre-impact activation of other devices, impact avoidance systems, or even a parking assist system, allowing the cost of the sensing system 100 to be shared among many vehicle features.

Referring specifically to FIG. 3, in the event that while elevated, i.e., deployed, an external load F is brought upon the hood 40 as a result of an impact with an object, the self-locking mechanism operates in one of two modes described in the aforereferenced patents: (a) a locking mode in which the self-locking mechanism is configured to lock and prevent downward movement of member 64, and (2) a plastic deformation mode, in which the self-locking mechanism absorbs impact energy. The plastic deformation mode is preferred and reduces the loads placed upon the structural components of the hood deployment system, which should result in decreased cost.

The locking mode provides the option of absorbing the load in a variety of other ways, such as deformation of the hood 40, buckling of the inner tube 64, and deformation of an energy-absorbing component placed in-line with the inner tube 64. Examples of energy-absorbing components include, but are not limited to, resilient members such as compression springs and elastomers, and compliant and healable member such as that of shape memory materials.

Referring to FIGS. 4 and 5, wherein like numbers refer to like components from FIGS. 1-3, an alternative embodiment of the self-locking mechanism 76' for use with the hood elevation system is schematically depicted. Member 64', i.e., the inner tube, is connected at one end to the hood deployment linkage via a bracket. The opposing end of the inner tube 64' is connected to an inner member, i.e., sleeve 104, which is located inside the outer tube 84. Sleeve 104 is translatable in an extension direction to extend member 64', and a retraction direction to retract member 64'. The sleeve 104 defines a conical surface identified as ramp 108. Sleeve 104 is coupled to the shuttle 80' by an annular shear element 112. The shuttle 80' includes a retainer 114 that defines a plurality of holes 116 that space and retain roller elements, i.e., balls 120, uniformly around the circumference of the sleeve 104. The roller elements 120 are retained radially between the ramp 108 of sleeve 104 and the inner surface 124 of the outer tube 84. A guide ring 128 supports the shuttle 80' on the inner surface 124 of the outer tube 84.

The shuttle 80' is connected to an actuating member 88' and is coaxial to the outer tube 84. The actuating member 88' is translatable to drive the shuttle 80', the retainer 114, the roller elements 120, the guide ring 128, the shear element 112, the sleeve 104 and inner tube 64' for the purposes of extension and retraction. The ramp 108 includes a first end 132 and a second end 136. The first end 132 is characterized by a greater distance from the inner surface 124 than the second end 136. The outer tube 84 is connected to the vehicle structure, in this application, through appropriate mounting hardware such as the frame shown at 96 in FIG. 1.

The actuating member 88' is connected to the motor, shown at 72 in FIGS. 1-3, by an apparatus configured to convert the rotational motion of the motor to linear motion. For example, the output shaft of the motor may have a pinion gear mounted thereto, and the actuating member 88' may have a rack gear thereon engaged with the pinion gear.

Part of the retainer 114 extends between the roller elements 120 and the second end 136 of the ramp 108. The retainer is substantially rigidly connected to the actuating member 88' via the shuttle 80' for substantially unitary movement therewith. Thus, when the actuator drives the actuating member 88' in the retraction direction, the retainer 114 is also moved in the retraction direction and, in turn, drives the rolling elements in the retraction direction. In a first mode of operation, illustrated in FIGS. 4 and 5, the ramp 108 is also connected to the shuttle 80', the retainer 114, and the actuating member 88' via the shear element 112 for unitary movement therewith. Thus, the portion of the retainer between the roller elements 120 and the second end 136 of the ramp restricts relative movement between the roller elements 120 and the ramp 108 when the actuating member 88' drives the shuttle 80' and the sleeve 104 with ramp 108 in the retraction direction. The retainer 114 thereby prevents the roller elements from moving to a segment of the ramp where there is inadequate clearance between the ramp 108 and the inner surface 124. The retainer 114 thus allows the actuator to move inner member 104, member 64', and the hood to move in the retraction direction through movement of the actuating member 88'.

The load capacity of shear element 112 can be tailored to allow the self-locking mechanism 76' to operate in the first mode and a second mode. The self-locking mechanism 76' operates in the first mode when the load transmitted by the hood to the inner tube 64', via the hinges and linkage, is less than the load capacity of the shear element 112. The shear element 112 therefore remains intact, and the sleeve 104 and the shuttle 80' are rigidly interconnected for unitary movement within the outer tube 84.

When an external load is brought upon the hood 40 that is consistent with an impact, the load is transmitted into the self-locking mechanism 76' via the hood and the hood deployment linkage. The inner tube 64' and sleeve 104 will transmit this load into the shear element 112 whose movement is fixed relative to the shuttle 80' and actuating member 88'. The load being sufficient to overcome the load capacity of the shear element 112 will initiate the second mode of the self-locking mechanism 76'. In the second mode, shown in FIG. 6, the shear element 112 will separate into multiple segments, decoupling the inner tube 64' and sleeve 104 from the shuttle 80' and retainer 114.

As the inner tube 64' and sleeve 104 translate relative to the shuttle 80', the retainer 114, and the rolling elements 120, the rolling elements 120 will move with respect to the ramp 108 toward the second end 136, where there is inadequate clearance between the ramp 108 and the inner surface 124 to accommodate the rolling elements 120. In other words, the rolling elements 120 will traverse radially due to the load being applied on them by ramp 108 as they move from the first end 132 toward the second end 136. Rolling elements 120 will begin to wedgingly engage the inner surface 124 of the outer tube 84, resisting downward movement of the hood and member 64', either by causing the sleeve 104 and member 64' to lock with respect to the outer tube 84, or by plastically deforming the outer tube 84. In the second mode, the self-locking mechanism 76' preferably absorbs energy from the hood via a plowing action in which the rolling elements 120 form grooves in the outer tube 84 as they traverse the inner surface 124. Alternatively, in the second mode, the self-locking mechanism 76' locks, enabling energy absorption through accordion buckling of the inner tube 64', with an energy-absorbing member placed in-line with the motor, etc.

Thus, the self-locking mechanism 76' includes an interconnecting element, i.e., shear element 112, that rigidly interconnects the ramp 108, the retainer 114, and the actuating member 88', provided that the load exerted on the inner tube 64' is below a predetermined amount. When the interconnecting element rigidly interconnects the ramp 108, retainer 114 and actuator 88', the position of the ramp 108 with respect to the retainer 114 and the rolling elements 120 remains substantially constant, and the rolling elements 120 are positioned not to interfere with translation of the inner tube. When the force exerted on the inner tube exceeds the predetermined amount, the ramp is movable relative to the retainer 114 and the rolling elements 120 so that the ramp exerts a radial force on the rolling elements 120, driving them against the inner surface 124.

Figure 8:
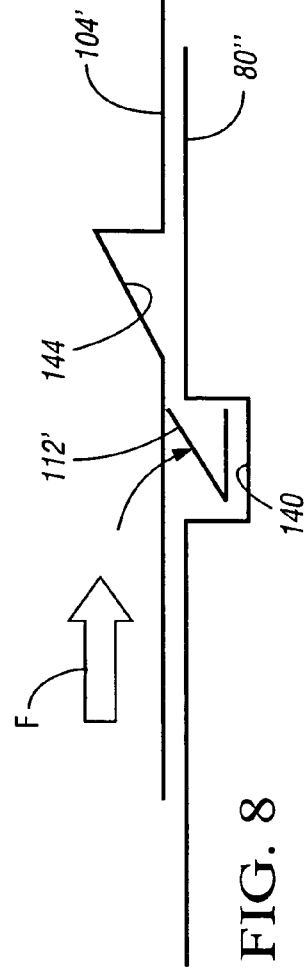
FIG. 8 is a schematic cross-sectional side view of the alternative self-locking configuration of FIG. 7 in a second mode.

An alternative shear element 112' is schematically depicted in FIGS. 7 and 8, wherein like reference numbers refer to like components from FIGS. 1-6. Shear element 112' is affixed to shuttle 80'' in notch 140 and extends into notch 144 formed in sleeve 104'. When the force exerted by the inner tube and sleeve 104' in the retraction direction is less than a predetermined amount, the shear element 112' interconnects sleeve 104' and shuttle 80" for unitary translation within the outer tube, i.e., for the first mode of the self-locking mechanism, as shown in FIG. 7. When the force exerted by the inner tube and sleeve 104' in the retraction direction is greater than the predetermined amount, the shear element 112' deforms sufficiently such that it is not engaged in notch 144, and sleeve 104' is translatable relative to shuttle 80" for the second mode of the self-locking mechanism, as shown in FIG. 8. Deformation of shear element 112' may be elastic or plastic. Examples of shear element materials include, but are not limited to, ferrous and non-ferrous materials, polymers, elastomers or compliant and healable members such as that of shape memory materials. The use of a shape memory material is advantageous when deformation is plastic because the material can be readily returned to its first mode shape to prevent relative movement of the shuttle and sleeve.

Figure 9:
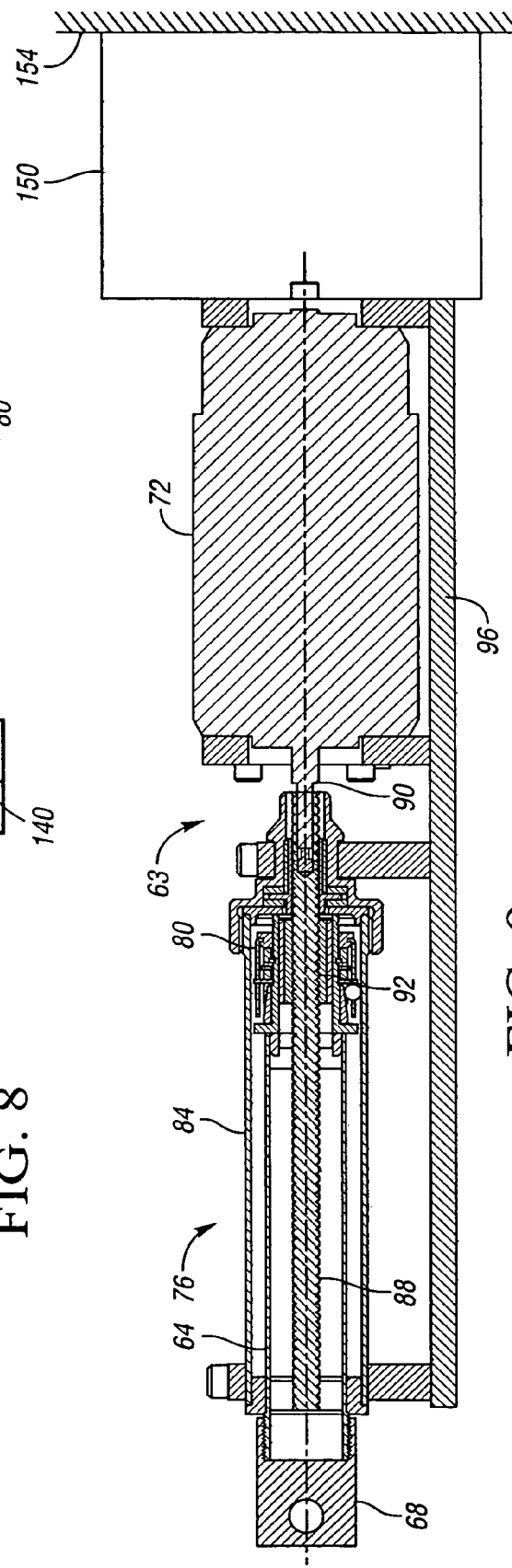
FIG. 9 is a schematic side view of the hood elevation system of FIG. 1 with an inline healable energy absorbing member.

Referring to FIG. 9, wherein like reference numbers refer to like components from FIGS. 1-3, the hood energy absorption system 63 is schematically depicted attached to an energy absorbing member 150. The energy absorbing member 150 is mounted to the vehicle's upper mid-rail 154. The energy absorbing member is characterized by a first size and shape, as shown in FIG. 9. When a downward force is exerted on the hood in the elevated position, the force is transmitted to the energy absorbing member 150, which deforms to a second size and shape and thereby absorbs energy. The energy absorbing member is preferably comprised of a shape memory material, and is configured to return to the first size and shape when exposed to a stimulus such as sufficient heat. For example, electrical resistance heating of the energy absorbing member 150 may be applied to return the member 150 to its original state, i.e., the first size and shape.

Figure 10:
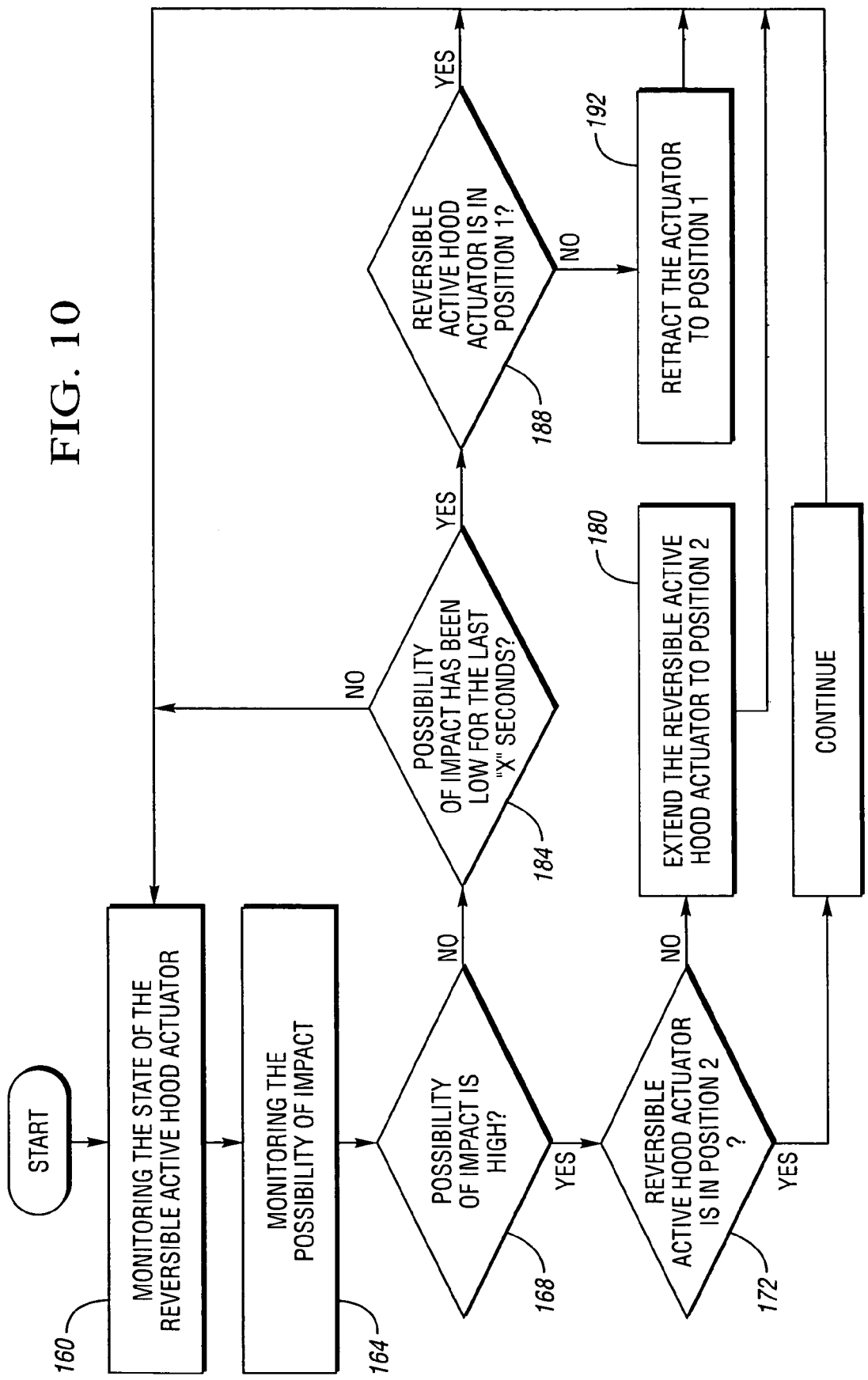
FIG. 10 is a graphical depiction of a method for employing the hood elevation system of FIG. 1.

FIG. 10 depicts a method for selectively raising and lowering a vehicle hood, and represents an exemplary control algorithm for the reversible active hood actuator, and more particularly for the sensing system controller, shown at 102 in FIG. 1. Referring to FIGS. 1 and 10, the controller 102 monitors the state of the hood actuator, i.e., whether the hood 40 is in the elevated or retracted position (step 160). The controller also monitors the possibility of vehicle impact (step 164), which typically involves monitoring the vehicle operating environment with sensors 101, and determining whether certain predetermined conditions exist that are indicative of a pending vehicle impact. An exemplary pre-impact sensing system and method is described in U.S. Pat. No. 6,813,562, issued Nov. 2, 2004 to Altan et al, and which is hereby incorporated by reference in its entirety.

The controller 102 inquires whether the possibility of a vehicle impact is high (step 168), e.g., whether the predetermined conditions presently exist. If the answer to the inquiry at step 168 is yes, then the controller 102 inquires whether the hood actuator 63 is such that the hood is in the elevated position (step 172). If the answer to the inquiry at step 172 is yes, then the controller resumes at step 160. If the answer to the inquiry at step 172 is no, then the controller causes the motor 72 to extend member 64 to raise the hood 40 to the elevated position (step 180).

If the answer to the inquiry at step 168 is no, then the controller inquires whether the possibility of impact has been low for at least a predetermined duration of time (step 184), that is, whether the predetermined conditions have not existed within the preceding predetermined amount of time. If the answer to the inquiry at step 184 is yes, then the controller 102 inquires whether the hood actuator 63 is such that the hood is in the retracted position (step 188). If the answer to the inquiry at step 188 is no, then the controller 102 causes the motor 72 to retract member 64 in order to move the hood to the retracted position (step 192).

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a hood configured to extend above and over a front compartment;
a support member operatively connected to the hood;
an actuator configured to selectively raise and lower the hood by extending and retracting the support member, respectively;
a locking mechanism operatively interconnecting the actuator and the support member and sufficiently configured to resist downward movement of the hood caused by a force exerted on the hood during a vehicle impact while allowing downward movement of the hood initiated by the actuator;
an outer tube characterized by an inner surface;
an inner member operatively connected to the support member and located within the outer tube for translation in an extension direction in which the support member is extended and in a retraction direction in which the support member is retracted;
a ramp on the inner member facing the inside surface of the outer tube, the distance between the ramp and the inside surface of the outer tube being greater at a first end of the ramp than at a second end of the ramp;
a rolling element between the ramp and the inside surface of the outer tube; and
a retainer member configured to restrict relative movement of the roller element toward the second end of the ramp during movement of the support member caused by the actuator, and thereby prevent the roller element from wedgingly engaging the inside surface of the outer tube.

2. The vehicle of claim 1, wherein the locking mechanism is configured so that the movement of the inner member in the retraction direction caused by a force exerted on the hood results in relative movement between the ramp and the retainer member whereby the ramp drives the roller element into wedging engagement with the inside surface thereby to restrict relative movement between the ramp and the outer tube.

3. The vehicle of claim 2, further comprising a shear element configured to substantially rigidly interconnect the inner member and the retainer member for unitary movement when the force exerted on the hood is below a predetermined magnitude, and to allow relative movement between the inner member and the retainer member when the force is above the predetermined magnitude.

4. The vehicle of claim 3, wherein the shear element is configured to break when the force exceeds the predetermined magnitude.

5. The vehicle of claim 1, further comprising at least one controller; and at least one sensor configured to monitor at least one vehicle condition and transmit sensor signals indicative of said at least one vehicle condition to said at least one controller;

wherein said at least one controller is configured to determine whether the sensor signals indicate the presence of said at least one predetermined vehicle condition and to cause the actuator to raise at least a portion of the hood in response to the sensor signals indicating the presence of said at least one predetermined vehicle condition.

6. A vehicle comprising:
a hood configured to extend above and over a front compartment;
a support member operatively connected to the hood;
an actuator configured to selectively raise and lower the hood by extending and retracting the support member, respectively;
a locking mechanism operatively interconnecting the actuator and the support member and sufficiently configured to resist downward movement of the hood caused by a force exerted on the hood during a vehicle impact while allowing downward movement of the hood initiated by the actuator; and
material sufficiently positioned with respect to the locking mechanism to receive at least part of the force and being plastically deformable when the force exceeds a predetermined magnitude.

7. The vehicle of claim 6, wherein the material is a shape memory material.

8. A method comprising:
monitoring a possibility of a vehicle impact;
raising a vehicle hood in response to determining that the possibility of impact is higher than a predetermined amount; and
lowering the vehicle hood in response to the possibility of impact being below the predetermined amount for a predetermined duration of time;
wherein said monitoring the possibility of vehicle impact includes monitoring a vehicle operating environment for at least one predetermined condition indicative of an elevated risk of vehicle collision.

9. A vehicle comprising:
a hood configured to extend above and over a front compartment;
a support member operatively connected to the hood;
an actuator operatively connected to the support member and configured to selectively raise and lower at least a portion of the hood by extending and retracting the support member;
a locking mechanism operatively interconnecting the support member to the actuator and including an outer tube characterized by an inner surface,
   an inner member operatively connected to the support member and supported within the outer tube for translation in an extension direction in which the support member is extended and in a retraction direction in which the support member is retracted,
   a ramp on the inner member facing the inside surface of the outer tube, the distance between the ramp and the inside surface of the outer tube being greater at a first end of the ramp than at a second end of the ramp,
   a rolling element between the ramp and the inside surface of the outer tube, and
   a retainer member configured to at least partially extend between the roller element and the second end of the ramp during movement of the support member caused by the actuator to restrict relative movement of the roller element and the ramp and thereby prevent the roller element from wedgingly engaging the inside surface of the outer tube; and
wherein the locking mechanism is configured so that movement of the inner member in the retraction direction caused by a force exerted on the hood results in relative movement between the ramp and the retainer member whereby the ramp drives the roller element into wedging engagement with the inside surface.

* * * * *